United States Patent
Li et al.

(10) Patent No.: US 11,509,407 B2
(45) Date of Patent: Nov. 22, 2022

(54) TECHNIQUES IN NEW RADIO (NR) RADIO RESOURCE MANAGEMENT (RRM) PERFORMANCE ACCURACY MEASUREMENTS

(71) Applicant: Apple Inc., Cupertino, CA (US)

(72) Inventors: Hua Li, Beijing (CN); Jie Cui, Santa Clara, CA (US); Yang Tang, San Jose, CA (US); Tom Harel, Shefayim (IL); Rui Huang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/267,769

(22) PCT Filed: Aug. 9, 2019

(86) PCT No.: PCT/US2019/045994
§ 371 (c)(1),
(2) Date: Feb. 10, 2021

(87) PCT Pub. No.: WO2020/033885
PCT Pub. Date: Feb. 13, 2020

(65) Prior Publication Data
US 2021/0167871 A1 Jun. 3, 2021

Related U.S. Application Data (60) Provisional application No. 62/717,677, filed on Aug. 10, 2018.

(51) Int. Cl.
*H04B 17/318* (2015.01)
*H04B 17/24* (2015.01)
*H04B 17/336* (2015.01)

(52) U.S. Cl.
CPC .......... *H04B 17/24* (2015.01); *H04B 17/318* (2015.01); *H04B 17/336* (2015.01)

(58) Field of Classification Search
CPC ..... H04B 17/24; H04B 17/318; H04B 17/336
See application file for complete search history.

(56) References Cited

U.S. PATENT DOCUMENTS

2003/0103003 A1  6/2003  Ferreol et al.
2015/0326258 A1  11/2015  Song et al.
(Continued)

FOREIGN PATENT DOCUMENTS

WO  WO 2015/178911 A1  11/2015
WO  WO 2017/095467 A1  6/2017
WO  WO 2018/144384 A1  8/2018

OTHER PUBLICATIONS

International Search Report and Written Opinion of the International Searching Authority directed to related International Patent Application No. PCT/US2019/045994, dated Nov. 28, 2019; 11 pages.

(Continued)

*Primary Examiner* — Minh Trang T Nguyen
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for accuracy measurements in UE baseband-demodulation-performance tests in new radio (NR) frequency range 2 (FR2) operations. The accuracy measurements includes, but not limited to, reference signal received power (RSRP) accuracy, reference signal received quality (RSRQ), and signal-to-noise and interference (SINR) accuracy. Various embodiments describe how to measure RSRP/RSRQ/SINR accuracies in an over-the-air (OTA) test environment in NR FR2 operations.

20 Claims, 7 Drawing Sheets

(56) References Cited

U.S. PATENT DOCUMENTS

2016/0050036 A1    2/2016  Yang et al.
2016/0173211 A1    6/2016  Ouyang et al.
2019/0110300 A1*   4/2019  Chen ................... H04W 72/042

OTHER PUBLICATIONS

Intel Corporation, 'NR Test Methods UE RRM testing methodology', R4-1808745, 3GPP TSG-RAN WG4 Meeting AH 1807, Montreal, Canada, Jun. 25, 2018; See sections 1, 2.2-2.4; and figure 2.
Intel Corporation, 'TP to TR 38.810 on open items for UE Demodulation and CSI testing methodology', R4-1808748, 3GPP TSG-RAN WG4 Meeting AH 1807, Montreal, Canada, Jun. 25, 2018; See section 7.2.
Extended European Search Report from related European Application No. 19845967.9, dated Feb. 25, 2022; 12 pages.
Chinese Application No. 201980052054.3, First Office Action dated Mar. 14, 2022; with English Translation of Search Results from EPO Global Dossier, 14 pages.
Intel Corporation, "TP to TR 38.810 on open items for UE RRM testing methodology," R4-1808747, 3GPP TSG-RAN WG4 Meeting AH 1807, Montreal, Canada, Jul. 2-6, 2018; 5 pages.

* cited by examiner

TECHNIQUES IN NEW RADIO (NR) RADIO RESOURCE MANAGEMENT (RRM) PERFORMANCE ACCURACY MEASUREMENTS

CROSS REFERENCE TO RELATED APPLICATION

The present application is a National Stage entry from PCT/US2019/045994 filed on Aug. 9, 2019, entitled "Techniques in New Radio (NR) Radio Resource Management (RRM) Performance Accuracy Measurements," which claims priority to U.S. Provisional Patent Application No. 62/717,677, filed Aug. 10, 2018, entitled "Techniques for Measuring New Radio (NR) Radio Resource Management (RRM) Performance Accuracy for Frequency Range 2 (FR2)," all of which are hereby incorporated by reference in their entireties.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Existing user equipment (UE) demodulation performance tests may not be adequate in developing wireless networks due to various changes in millimeter wave (mmWave) frequency operations. For example, New Radio (NR) wireless communication systems may operate in mmWave frequency range with beamforming and associated techniques. Various existing accuracy measurements corresponding to or part of the demodulation performance tests may become inapplicable while operations are in mmWave frequency range.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

Fifth generation (5G) NR wireless communication systems may operate in multiple frequency ranges including an mmWave frequency range above 6 GHz, for example, NR Frequency Range 2 (FR2) from 24250 MHz to 52600 MHz. In NR communications with respect to mmWave, it is reasonable to expect a greater level of integration for high-frequency devices (FR2 devices or devices to be operated in FR2) than seen today with the Third Generation Partnership Project (3GPP) standard for Long Term Evolution (LTE) devices and NR devices operating in lower frequencies, for example, NR Frequency Range 1 (FR1) from 450 MHz to 6000 MHz. Such highly integrated devices may feature innovative front-end solutions, multi-element antenna arrays, passive and active feeding networks, etc., so that existing test techniques used for devices to be operated in LTE and/or NR FR1 frequencies may become inadequate for measurements associated with UE radio frequency (RF) performance, radio resource management (RRM) performance, demodulation performance, and channel state information (CSI) reporting performance in FR2 operations.

A highly integrated NR device may not be physically accessible by a front-end cable connector to connect to a test equipment (TE), because the interface between the front-end and the antenna may be an antenna-array feeding network, which is tightly integrated and, therefore, precludes the possibility of exposing a test connector, and so on. For example, there may not be access points to a baseband port, because the baseband port may be integrated with RF circuitry, integrated with an RF antenna array through some feeding network, or integrated with intermediate frequency (IF) circuitry. A greater level of integration of high-frequency devices including devices operating above 6 GHz may drive the need for over-the-air (OTA) testing of all 1) UE RF performance requirements, 2) UE RRM performance requirements, and/or 3) UE demodulation and CSI performance requirements (further denoted as UE demodulation without loss of generality). Thus, conventional UE demodulation test setup may not be applicable due to highly integrated realization of UE baseband and RF components. Embodiments described herein may include, for example, apparatuses, methods, and storage media for measurements of, or related to, accuracy measurements in UE demodulation performance tests in NR FR2 operations. Various embodiments described herein may provide adequate accuracy including absolute and/or relative accuracy measurements in demodulation performance tests in an over-the-air (OTA) test environment, other associated test environments, and/or implemented network environments.

Figure 1:
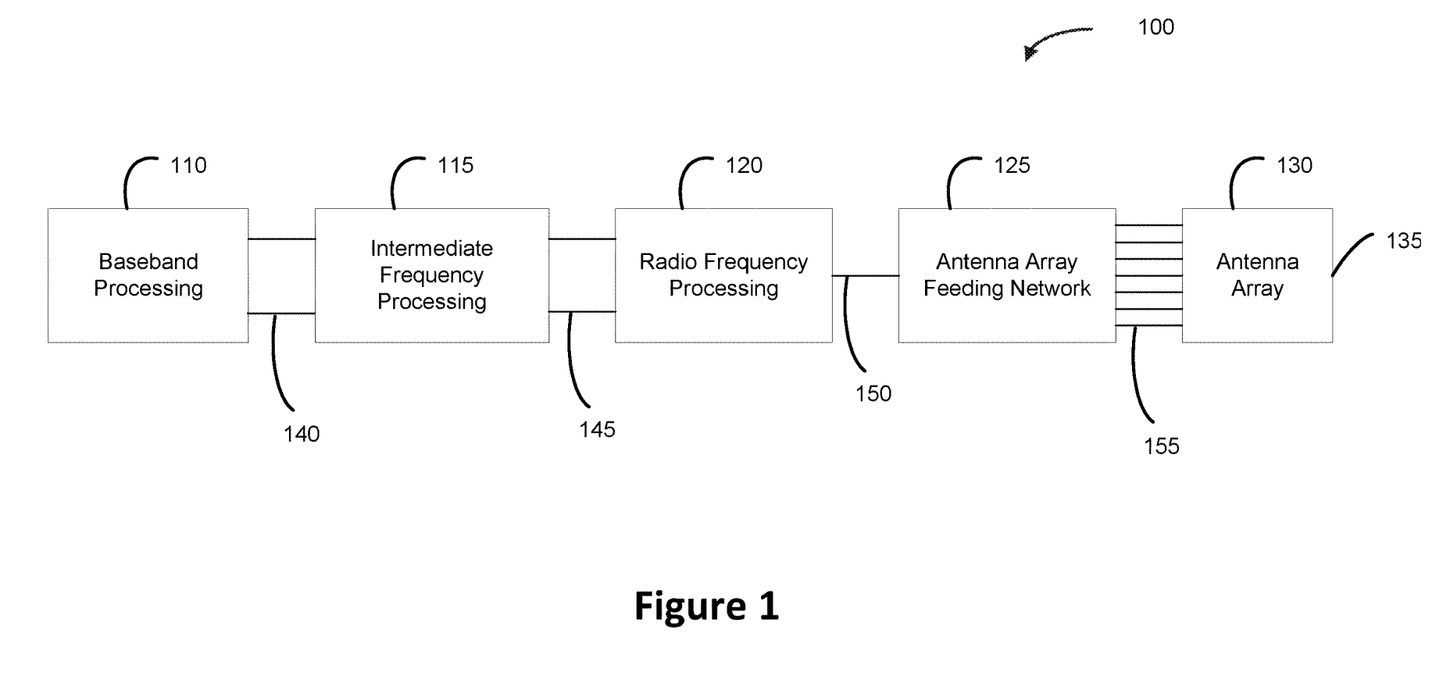
FIG. 1 schematically illustrates an example block diagram of an architecture of a UE operating in compliance with NR standards, in accordance with various embodiments.

FIG. 1 schematically illustrates an example block diagram of an architecture of a UE 100 operating in compliance with NR FR2 standards in accordance with one or more embodiments. The UE 100 may be a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, Vehicle mounted UE or any computing device including a wireless communications interface. In some embodiments, the UE 100 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The UE 100 includes baseband processing circuitry 110, IF processing circuitry 115 if applicable, RF processing circuitry 120, an antenna-array matching network 125, and an antenna array 130. Based on the latest NR standards defined by the 3GPP, it is reasonable to expect that all or a vast majority of NR tests will be defined and tested with respect to an OTA measurement reference 135 at an input of antenna array 130 for a frequency range 1 (FR1) operation. However, for the UE 100 operating in FR2, at least certain demodulation performance tests may be defined and/or tested with respect to an input of the RF processing circuitry 120 as a reference point.

In some embodiments, baseband processing circuitry 110 may include multiple parallel baseband chains. Each baseband chain may process baseband signals and be the same or substantially similar to the baseband circuitry 204 in FIG. 2. RF processing circuitry 115 may include multiple parallel RF chains or branches corresponding to one or more baseband chains. One baseband chain may be coupled with one or more RF chains and one RF chain may be coupled with one or more baseband chains, depending on various UE architectures. Each RF chain or branch may be coupled with one antenna-array matching network 125, which may be coupled with one or more antenna arrays 130. It is noted that "baseband chain," "baseband branch," and "baseband port" are used interchangeably in this application. A baseband chain may also refer to a receiver branch regarding UE reception.

In some embodiments, the UE 100 may include protocol processing circuitry that may include one or more instances of control circuitry to provide control functions for the baseband processing circuitry 110, IF processing circuitry 115, RF processing circuitry 120, antenna-array feeding network 125, and antenna array(s) 130.

It is noted that in NR operations with respect to mmWave (FR2), baseband port 140 may not be accessible to test equipment to conduct a direct baseband-demodulation performance test due to the highly integrated baseband/RF circuitry. Similarly, IF port 145, RF port 150, and antenna element inputs 155 may not have access points either from test equipment point of view. In addition, antenna array 130 may be used in mmWave operations, which refer to frequencies above 6 GHz. Thus, conductive measurements are not applicable for FR2 NR. Instead, OTA measurement may apply to most of, if not all, NR UE performance measurements in FR2.

Figure 2:
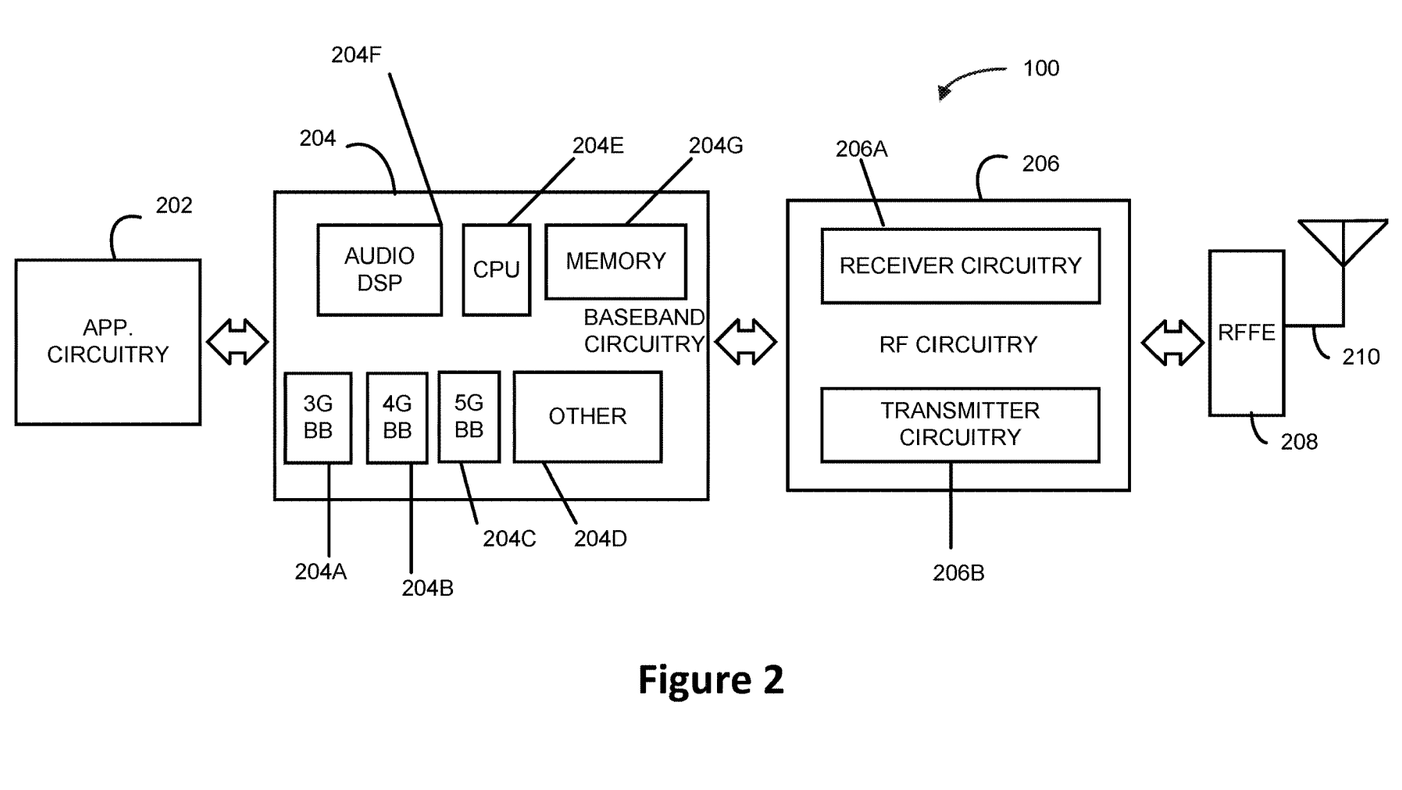
FIG. 2 illustrates example components of a UE in accordance with various embodiments.

FIG. 2 illustrates example components of the UE 100 in accordance with some embodiments. In contrast to FIG. 1, FIG. 2 shows example components of the UE 100 from receiving and transmitting function point of view, and it may not include all of the components described in FIG. 1. In some embodiments, the UE 100 may include application circuitry 202, baseband circuitry 204, RF circuitry 206, RF front-end (RFFE) circuitry 208, and a plurality of antennas 210 together at least as shown. In some embodiments, the UE 100 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processors may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 100. In some embodiments, processors of application circuitry 202 may process IP data packets received from an evolved packet core (EPC).

The baseband circuitry 204 may include circuitry such as, but not limited to, one or more single-core or multi-core processors. The baseband circuitry 204 may be similar to and substantially interchangeable with the baseband circuitry 110 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolutional, tail-biting convolutional, convolutional turbo, Viterbi, Polar, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. The RF circuitry 206 may be similar to and substantially interchangeable with the RF processing circuitry 120 in some embodiments. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

The RFFE circuitry 208 may include a receive signal path, which may include circuitry configured to operate on RF beams received from one or more antennas. The RF beams may operate in mmWave, sub-mmWave, or microwave frequency range. The RFFE circuitry 208 coupled with the one or more antennas 210 may receive the transmit beams and proceed them to the RF circuitry 206 for further processing. The RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208. The RFFE circuitry 208 may include an antenna-array feeding network similar to and substantially interchangeable with the antenna-array feeding network 125 in some embodiments.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE, described in further detail below.

Figure 3A:
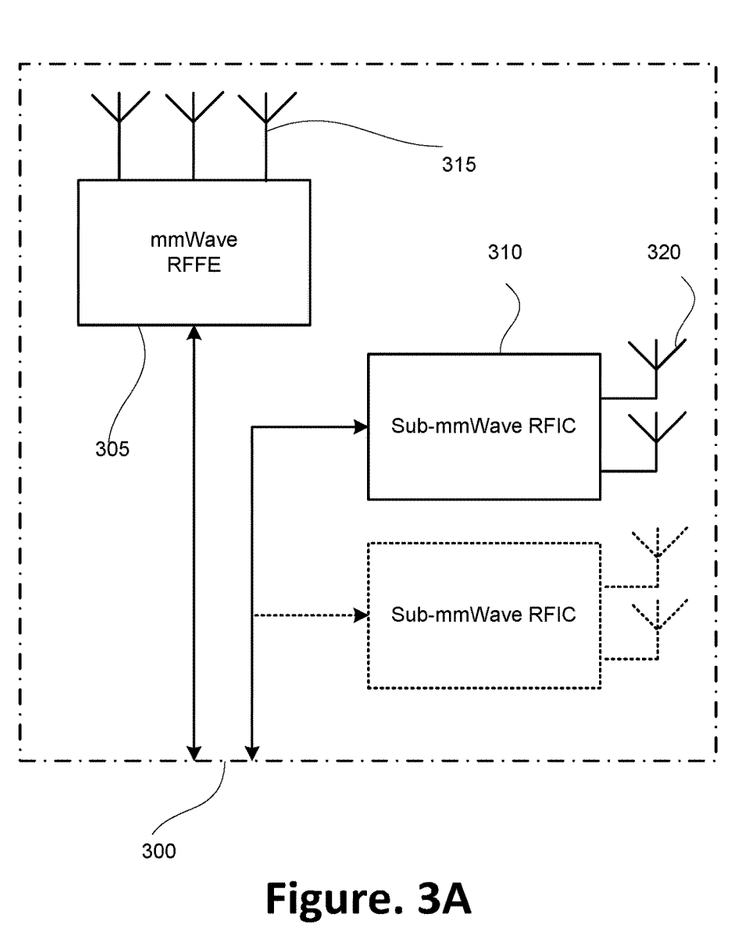
FIG. 3A illustrates an example block diagram of a radio frequency front end (RFFE) of a UE operating in a frequency range 2 (FR2), in accordance with various embodiments.

FIG. 3A illustrates an example of a radio frequency front end 300 incorporating an mmWave RFFE 305 and one or more sub-6 GHz radio frequency integrated circuits (RFICs) 310. The mmWave RFFE 305 may be similar to and substantially interchangeable with the RFFE 165, RFFE 170, and/or the RFFE circuitry 208 in some embodiments. The mmWave RFFE 305 may be used for the UE 105 while operating in FR2 or mmWave; the RFICs 310 may be used for the UE 105 while operating in FR1, sub-6 GHz, or LTE bands. In this embodiment, the one or more RFICs 310 may be physically separated from the mmWave RFFE 305. RFICs 310 may include connection to one or more antennas 320. The RFFE 305 may be coupled with multiple antennas 315, which may constitute one or more antenna panels.

Figure 3B:
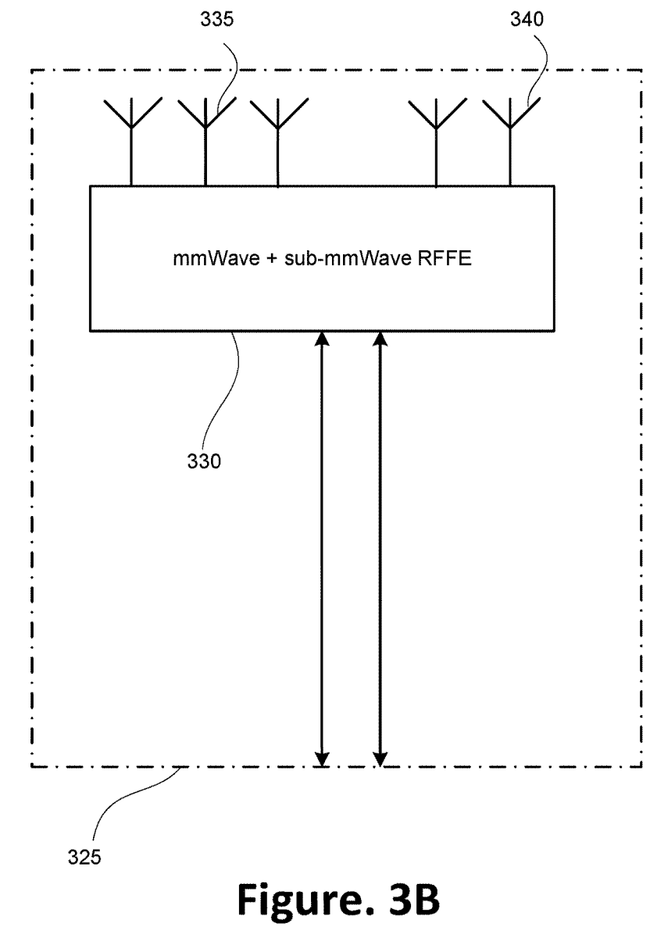
FIG. 3B illustrates another example block diagram of an alternative RFFE in accordance with various embodiments.

FIG. 3B illustrates an alternate example of an RFFE 325, in accordance with various embodiments. In this aspect both millimeter wave and sub-6 GHz radio functions may be implemented in an mmWave and sub-mmWave RFFE 330. The RFFE 330 may incorporate both millimeter wave antennas 335 and sub-6 GHz antennas 340. The RFFE 330 may be similar to and substantially interchangeable with the RFFE 165, RFFE 170, and/or the RFFE circuitry 208 in some embodiments.

Figure 4:
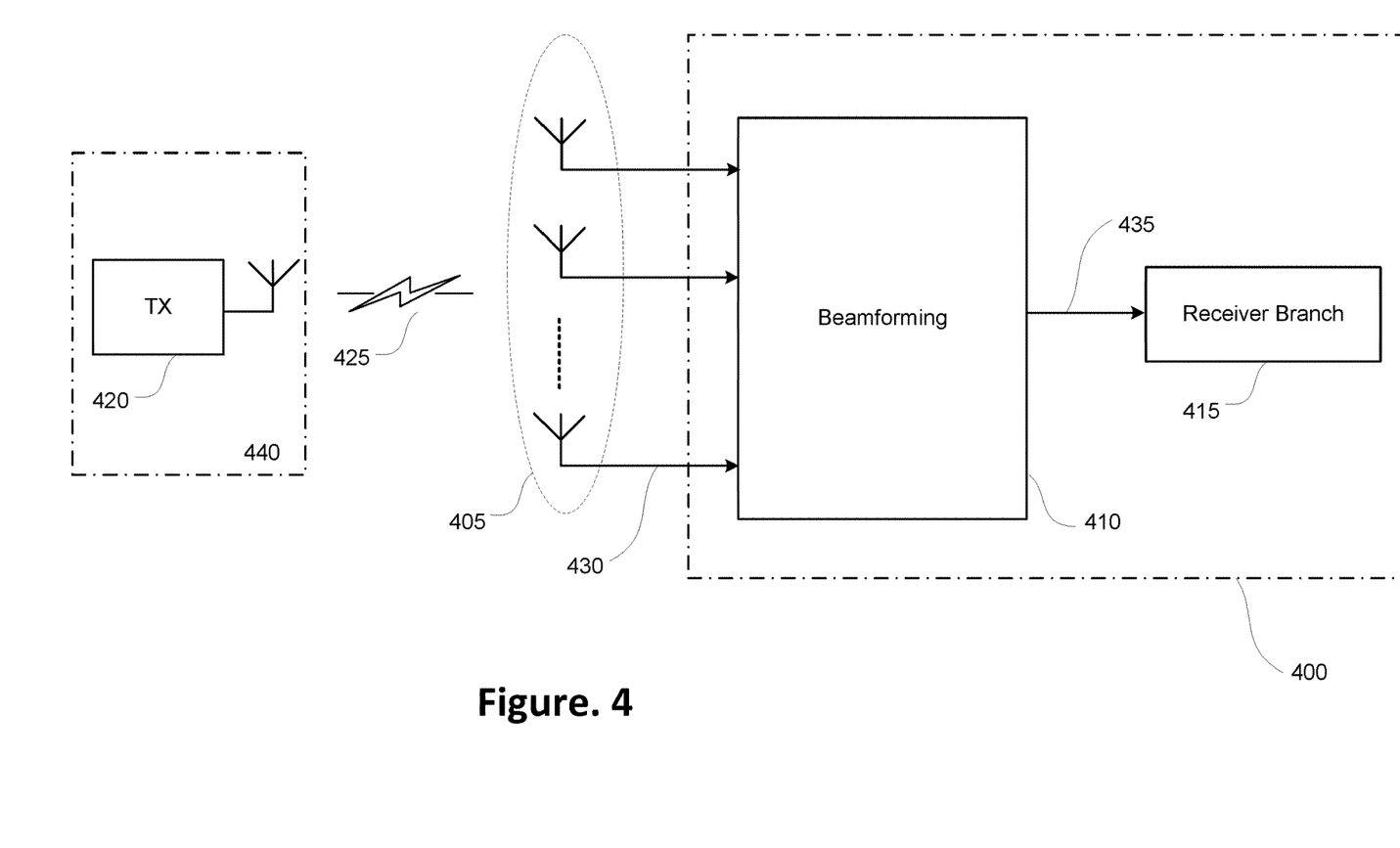
FIG. 4 illustrates an example of an over-the-air (OTA) test environment, in accordance with various embodiments.

FIG. 4 schematically illustrates an exemplary receiver (RX) 400 according to various embodiments. The RX circuitry 400 may include all or parts of, the RFFE 208, the receiver circuitry 206A, or a combination thereof. Further, the RX circuitry 400 may include all or parts of the mmWave RFFE 305 or the RFFE 330. FIG. 4 may schematically illustrate how a receiving beam may be formed and processed by an RF front end and receiver circuitry in accordance with various embodiments.

The RX circuitry 400 may include one or more antenna arrays 405 (only one is showing in FIG. 4). In some embodiments, each antenna array 405 may include one or more antennas (or antenna elements), filters, low noise amplifiers, programmable phase shifters and power supplies (not shown). In other embodiments, some of those components may be a part of a receiver beamforming 410. The receiver beamforming 410 may include one or more filters, low noise amplifiers, programmable phase shifters and power supplies (not shown) to form a receiving beam for a receiver branch 415. In some embodiments, the receiving beam may be used for more than one receiver branch. The receiver branch 415 may further process the received signal and/or the receiving beam.

In some embodiments, the antenna array 405 and/or the RX circuitry 400 may receive a signal transmitted by another device that includes one or more transmitters (TX) 420. For the sake of simplicity, only one TX 420 is used in description herein. The TX 420 may include one or more antenna arrays to generate a transmitting beam while operating in FR2. The transmitting device may be a test equipment (TE) 440 in an OTA test environment. The signal may be transmitted to the UE 100 wirelessly via one or more wireless paths 425, which may be in compliance with a corresponding OTA test setup or configuration for certain measurements in FR2. Under such an OTA test setup, a transmitted signal power level and/or a signal-to-noise (SNR) of the transmitted signal may be configurable at one or more receiver reference points 430 before receiver beamforming, because of the limited and/or controllable path loss corresponding to the wireless paths 425. Thus, the received signal power level and/or the SNR of the received signal at reference point A may be configurable and controllable by properly setting up the TX 420. In contrast, a power level of the received signal and/or an SNR of the received signal at a reference point B 435 after the receiver beamforming 410 may not be configurable or measurable due to various limitations with respect to mmWave RFFE designs and realizations.

In a UE demodulation performance measurement in NR FR2 operations, including but not limited to a synchronization signal-reference signal received power (SS-RSRP), synchronization signal-reference signal received quality (SS-RSRQ), and synchronization signal signal-to-noise and interference (SS-SINR), the receiver of the UE 100 may be required to comply with one or more measurement accuracies. To simplify descriptions herein, only SS-RSRP and its pertinent measurements are discussed. SS-RSRQ and/or SS-SINR may be implemented in the same or a substantially similar approach as disclosed with respect to SS-RSRP. In addition, the SS-RSRP/SS-RSRQ/SS-SINR may be used interchangeably with RSRP/RSRQ/SINR throughout this disclosure. The former set of terms may be used exclusively in NR-related operations while handling synchronization signals (SSs). In embodiments, an SS-RSRP accuracy may be used to indicate how accurate a receiver can be or how much error it may have while measuring SS-RSRP regarding a specific synchronization signal (SS) or reference signal (RS). For example, if a UE receiver is measured with an RSRP accuracy of +3 dB, it means that the measured RSRP is 3 dB higher than the RSRP of the received SS or the real RSRP (a should-be RSRP). Such an RSRP accuracy may be referred to as an absolute RSRP accuracy and/or relative RSRP depending on other test conditions and implementations.

Conventionally in NR FR1 operations, an RSRP accuracy may be measured directly based on a configured or received RSRP and a measured RSRP by a UE receiver. For example, a TX may transmit a synchronization signal (SS) so that the UE receiver may receive the SS with an SS-RSRP value of X at a reference point of the antenna connector of the UE. In some embodiments, the TX 420 may be configured to transmit the SS at certain power level to ensure an SS-RSRP value of X at the reference point. Such a configured or received RSRP may be referred to as a base RSRP for calculating the RSRP accuracy. Then a measured RSRP by the UE receiver may be compared with the base RSRP. A difference between the two RSRP values may indicate the RSRP (or SS-RSRP) accuracy with respect to the UE. This reference point of an FR1 UE may equivalently be at the reference point 430 of the UE 100 operating in FR2. In contrast, in an FR2 UE or a UE operating in FR2, the reference point is defined as the reference point 435 after the receiver beamforming 410, because an RSRP shall be measured based on a combined signal from antenna elements corresponding to a given receiver branch. However, the receiver beamforming 410 may enhance a signal power level and/or quality so that the base RSRP may become unknown or undeterminable based on different receiver beamforming configurations and/or various UE receiver implementations. Therefore, an RSRP accuracy in FR2 may not be determinable according to the approaches in NR FR1. Various embodiments described below provide approaches to measuring the RSRP accuracy in FR2 operations.

In embodiments according to an OTA test environment, the TX 420 of the TE 440 may be configured to transmit a first signal for the UE 100 to measure RSRP and one or more associated accuracies. The first signal may include an SS for SS-RSRP measurements. The power level of the SS may be configured to be a relatively large value so that thermal noise may become sufficiently small to be neglected or omitted. Also, when the SS is sufficiently large, which means sufficiently larger than receiver sensitivity limits, the UE receiver may be considered to have no errors (or zero accuracy) while measuring the SS-RSRP. Thus, a base SS-RSRP may be determined based on an SS-RSRP measurement of the SS of power level S, in which S may be sufficiently large, by the UE 100. Note that the base SS-RSRP may be referred to as a "Geni" RSRP in certain 3GPP specifications. For example, S may be at least 10 dB or 20 dB greater than the corresponding thermal noise. In another example, S may be configured to be −50 dBm, which is substantially greater than a typical UE sensitivity level. Note that the power level S may be configured to various values depending on other parameters in an RSRP accuracy measurement, and the examples herein are showing exemplary values for illustrative purposes but not limiting them in any possible ways.

Note that in the OTA environment, path loss between the TX 420 and the UE receiver may be known and calibrated. Thus, the power level of SS received by the UE at the reference point 435 may be equal to or directly associated with the power level of the SS transmitted by the TX 420. For example, if the transmitted SS is −60 dBm, the received SS at reference point 430 may be −65 dBm due to 5 dB path loss caused by imperfections in test equipment and setup. Then the 5 dB path loss may be considered and/or calibrated as an offset in test configurations. Further, the received SS at reference point 435 may be −50 dBm based on a 15 dB gain beamforming. In some embodiments, the TX 420 may transmit the SS at a power level so that the UE 100 may receive the SS at power level S at the reference point 435.

In embodiments, the TX 420 may further transmit a second signal for the UE 100 to determine a measured SS-RSRP based on an SS-RSRP measurement of the second signal. The second signal may include the same SS and artificial noise. The SS in the second signal may be the same as or substantially similar to the SS of the first signal, and the power level of this SS may be configured to be the same S as the SS in the first signal. The power level (or noise level) of the artificial noise may be configured to be N so that the SNR of the second signal is to be a specific value S/N. The artificial noise may be generated to be effectively beamformed by the receiver beamforming 410 as the same or a substantially similar way to the SS. In some embodiments, the artificial noise may be correlated noise and/or interference, in contrast with the uncorrelated thermal noise. So the artificial noise can be beamformed with power enhancement. Thus, the SNR of the received second signal at the reference point may still be S/N or sufficiently close to S/N. Note that the power level of the artificial noise may be configured sufficiently large so that the thermal noise may be neglected or omitted in the same or substantially similar way as to the power level of the SS. In addition, the artificial noise may be set to a level higher than the SS power level to achieve a typical SNR requirement regarding the UE receiver. For example, an SNR of −6 dB may be required in a UE receiver implementation. Thus, as long as the SS power level is sufficiently higher than the thermal noise, the artificial noise may also be sufficiently large to neglect considerations of the thermal noise in calculating the RSRP accuracy in this approach.

In one example, if the SSs in both the first and second signals are transmitted at −60 dBm, and the power level of the artificial noise in the second signal is −55 dBm for the SNR of the second signal being of −5 dB. When the first signal is received and beamformed by the UE receiver, the SS of the first signal may become or be enhanced to −50 dBm at the reference point 435 due to a 10 dB gain by the UE receiver with beamforming. Note that any path loss may not be considered for purposes of illustration. Then, the second signal including both the SS and artificial noise is received and beamformed by the UE receiver. The SS of the second signal may be enhanced to −50 dBm at the reference point 435 due to a 10 dB gain by the UE receiver with beamforming, and the artificial noise may also be enhanced to −45 dBm by the receiver with beamforming. Thus, the received second signal may hold the same SNR of −5 dB and have the same SS power of −50 dBm.

In embodiments, the UE 100 may measure a second SS-RSRP based on the received second signal. Since the SS of the first signal and the SS of the second signal are transmitted at the same power level, the difference between the first SS-RSRP and the second SS-RSRP measured by the UE may indicate an SS-RSRP accuracy. If the UE 100 has a perfect accuracy that has no error in measuring an SS-RSRP in the baseband receiver, the two SS-RSRP of the respective first signal and second signal should have the same results, because the power levels of the two SSs are the same. However, the second signal contains noticeable artificial noise, which may be configured up to several dBs higher than the SS, and this may have an impact on the SS-RSRP accuracy for the UE 100. Thus, a different SS-RSRP value may result from the SS-RSRP measurement of the second signal from the measurement of the first signal, and this delta may indicate the SS-RSRP measurement accuracy while handling SS with noise and/or interference. In some embodiments, the SS-RSRP accuracy may be used to indicate an accuracy of a baseband receiver of the UE 100. Since the SS-RSRP measurements may include inaccuracies from the RF receiver or RFFE, by measuring the delta of the two SS-RSRP results, the RSRP delta may indicate the inaccuracy from the baseband receiver but not from the RF receiver.

In some embodiments, the second signal may be configured with an SNR side condition that is the same or substantially similar to the side condition as to FR1. An SNR side condition refers to a condition of SNR to design the pertinent UE requirements and/or associated test setup. For example, a −6 dB SNR may be required for the UE 100 to measure an SS-RSRP within certain accuracy. Accordingly, a −6 dB target SNR may be configured for the second signal.

In some embodiments, an RSRQ accuracy and/or an SINR accuracy may be measured in the same or a substantially similar approach. In an example of SS-SINR accuracy measurement, a first signal may be configured with a sufficiently good SNR value $S/N_1$ and a second signal may be configured with an SNR value $S/N_2$ that is to be under a to-be-measured condition. Then a difference between the first SINR result and the second SINR result may indicate the SINR accuracy. For example, $S/N_1$ of the first signal may be configured to be 20 dB for a base SS-SINR measurement. If the UE receiver measures the SS-SINR of 17 dB, there may be a −3 dB offset account for calibration or imperfection in the OTA setup. Then $S/N_2$ of the second signal may be configured to be −6 dB for a measured SS-SINR. If the second SS-SINR is measured at −8 dB, the SS-SINR delta may be calculated as (−8)−(−6)−(−3)=1 dB. This calculation accounts for the −3 dB offset determined in the base SS-SINR measurement. Thus, an SS-SINR accuracy may be +1 dB accordingly.

Figure 5A:
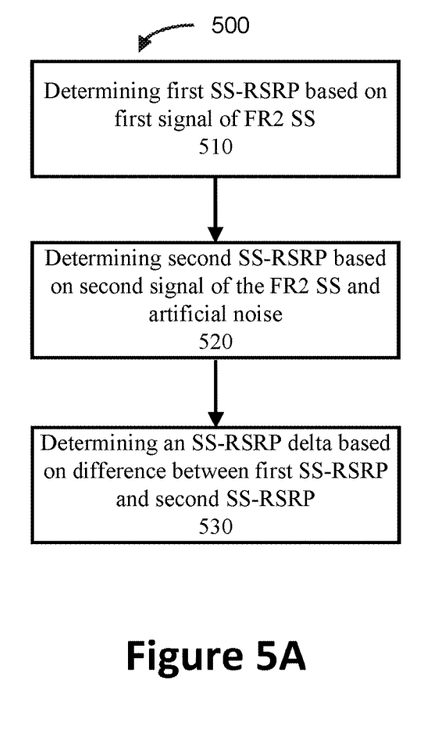
FIG. 5A illustrates an operation flow/algorithmic structure to facilitate a process of demodulation accuracy measurements by a UE in accordance with various embodiments.

FIG. 5A illustrates an operation flow/algorithmic structure 500 to facilitate a process of RSRP accuracy measurement in FR2 by the UE 100 in accordance with various embodiments. The operation flow/algorithmic structure 500 may be performed by the UE 100 or circuitry thereof. For example, in some embodiments the operation flow/algorithmic structure 500 may be implemented by digital baseband circuitry 204 and a CPU 204E. Note that RSRQ accuracy and/or SINR accuracy may be measured in the same or a substantially similar approach.

The operation flow/algorithmic structure 500 may include, at 510, determining a first SS-RSRP based on reception of a first signal of an FR2 SS. The SS may be configured based on a target power level S. The target power level S may be referred to a transmitting power level of the first signal, a receiving power level received by the UE 100 before receiver beamforming, or a receiving power level received by the UE 100 after receiver beamforming at a reference point defined for FR2 UEs. In embodiments, the UE 100 may receive the first signal from a TX of a TE in an OTA test environment. The first signal may be referred to as an SS of power level S or SS of target power level S. To determine the SS-RSRP of the first signal, the UE 100 may measure the SS-RSRP based on the received first signal according to a regular SS-RSRP measurement procedure.

The operation flow/algorithmic structure 500 may further include, at 520, determining a second SS-RSRP based on reception of a second signal that includes the FR2 SS and artificial noise. The SS in the second signal may be configured to be the same as the SS in the first signal, which is of power level S. The target power level S may be referred to a transmitting power level of the second signal, a receiving power level received by the UE 100 before receiver beamforming, or a receiving power level received by the UE 100 after receiver beamforming at a reference point defined for FR2 UEs. The power level of the SS of the second signal may be configured in the same way as the SS of the first signal. In embodiments, the UE 100 may receive the second signal from a TX of a TE in an OTA test environment. The second signal may have the artificial noise level at N, or the power level of the artificial noise is a power level N. The second signal may be configured with a target SNR. The UE may receive the second signal with a receiver beamforming configuration that is the same or unchanged receiver beamforming configuration used for receiving the first signal. To determine the SS-RSRP of the first signal, the UE 100 may measure the SS-RSRP based on the received first signal according to a regular SS-RSRP measurement procedure.

The operation flow/algorithmic structure 500 may further include, at 530, determining an SS-RSRP delta based on a difference between the first SS-RSRP and the second SS-RSRP. The first SS-RSRP may be referred to as a base SS-RSRP to represent an SS-RSRP without receiver error and/or inaccuracy. The second SS-RSRP may be referred to as a measured SS-RSRP to represent an SS-RSRP with receiver error and/or inaccuracy. The SS-RSRP delta may be calculated by dB.

In some embodiments, the UE 100 under test may report the SS-RSRP delta to the TE so that the TE may determine whether the UE 100 is within an allowed accuracy range. The UE may further determine an absolute or relative SS-RSRP accuracy based on the SS-RSRP delta. In some embodiments, the UE may report the determined absolute or relative SS-RSRP accuracy to the TE. In some other embodiments, the UE may determine whether it pass or fail the SS-RSRP accuracy requirement based on the RSRP delta or the determined absolute/relative accuracy.

Figure 5B:
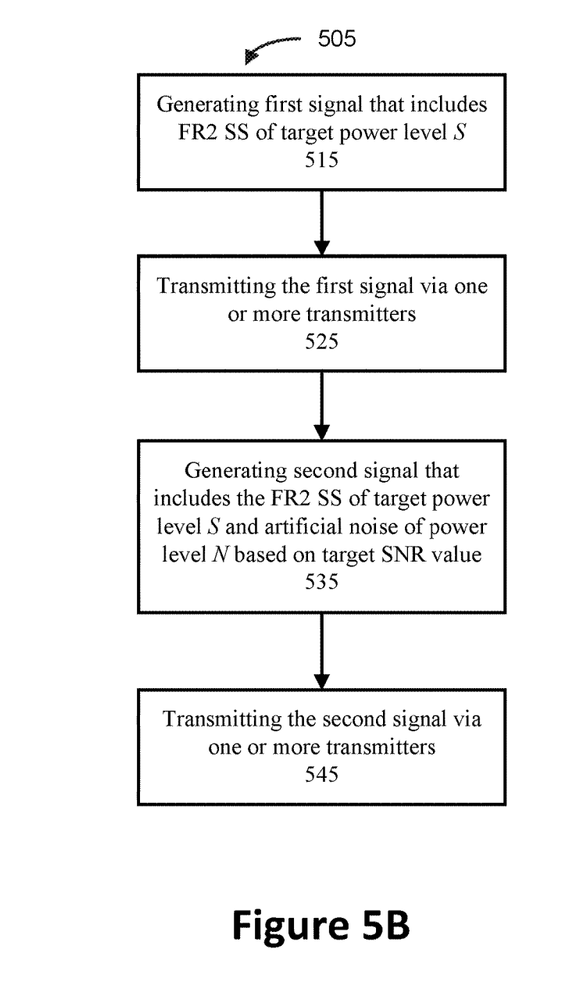
FIG. 5B illustrates an operation flow/algorithmic structure to facilitate the process of demodulation accuracy measurements by a test equipment (TE) in accordance with various embodiments.

FIG. 5B illustrates an operation flow/algorithmic structure 505 to facilitate the process of RSRP accuracy measurement in FR2 by the TE in accordance with various embodiments. The operation flow/algorithmic structure 505 may be performed by the TE 440 or circuitry thereof. For example, in some embodiments the operation flow/algorithmic structure 505 may be implemented by TX 420, TE 440, digital baseband circuitry 204, and a CPU 204E.

The operation flow/algorithmic structure 505 may include, at 515, generating a first signal that includes an FR2 SS of a target power level S. The first signal may include specific identification information associated with the SS-RSRP and/or SS-RSRQ measurements. The target power level S may be referred to a transmitting power level of the first signal, a receiving power level received by the UE 100 before receiver beamforming, or a receiving power level received by the UE 100 after receiver beamforming at a reference point defined for FR2 UEs.

The operation flow/algorithmic structure 505 may further include, at 525, transmitting the first signal via one or more transmitters to the UE 100. The transmission of the first signal may be via a test interface and/or after a test loop initialization. In some embodiments, the transmission of the first signal may be via measurement antennas.

The operation flow/algorithmic structure 505 may further include, at 535, generating a second signal that includes the FR2 SS of the target power level S and artificial noise of power level N, based on a target SNR value. The second signal may include specific identification information associated with the SS-RSRP and/or SS-RSRQ measurements. The target power level S and/or the power level N may hold the SNR value. Such an SNR value may be predetermined according to an SNR side condition in FR1 and/or FR2 operations.

The operation flow/algorithmic structure 505 may further include, at 545, transmitting the second signal via the one or more transmitters to the UE 100. The transmission of the second signal may be via the same test interface and/or after the test loop initialization. In some embodiments, the transmission of the second signal may be via measurement antennas. Note that the second signal may be transmitted to the UE before or after the first signal is transmitted to the UE.

In some embodiments, the TE may further receive a report that indicates an SS-RSRP/SS-RSRQ delta, or an SS-RSRP/SS-RSRQ accuracy. The TE may further determine whether the UE satisfies a corresponding RSRP/RSRQ accuracy requirement based on the received report. The determination may be based on comparison between the report value and one or more predetermined values. In some other embodiments, if the UE determines whether it satisfies the corresponding RSRP/RSRQ accuracy requirement, the TE may receive a message that indicates whether the UE satisfies the corresponding requirement.

Figure 6:
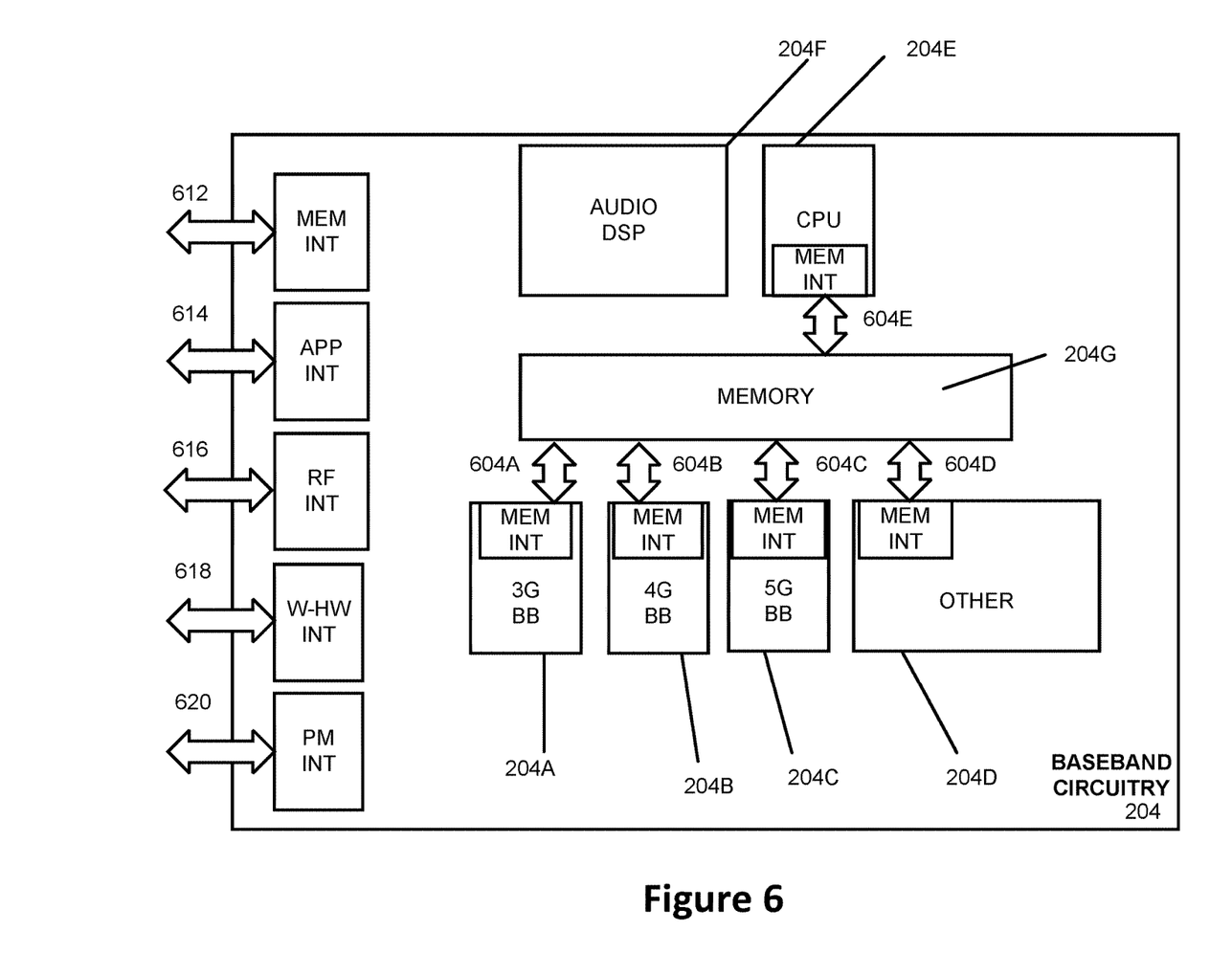
FIG. 6 illustrates example interfaces of baseband circuitry in accordance with some embodiments.

FIG. 6 illustrates example interfaces of baseband circuitry in accordance with some embodiments. As discussed above, the baseband circuitry 204 of FIG. 2 may comprise processors 204A-204E and a memory 204G utilized by said processors. The processors 204A-204E of the UE 100 may perform some or all of the operation flow/algorithmic structure 500, in accordance with various embodiments. Alternatively or additionally, processors 204A-204E of the UE 100 may perform some or all of the operation with respect to SS-RSRP accuracy measurements. The processors 204A-204E of the TE may perform some or all of the operation flow/algorithmic structure 505, in accordance with various embodiments. Each of the processors 204A-204E may include a memory interface, 604A-604E, respectively, to send/receive data to/from the memory 204G.

The baseband circuitry 204 may further include one or more interfaces to communicatively couple to other circuitries/devices, such as a memory interface 612 (e.g., an interface to send/receive data to/from memory external to the baseband circuitry 204), an application circuitry interface 614 (for example, an interface to send/receive data to/from the application circuitry 202 of FIG. 2), an RF circuitry interface 616 (for example, an interface to send/receive data to/from RF circuitry 206 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
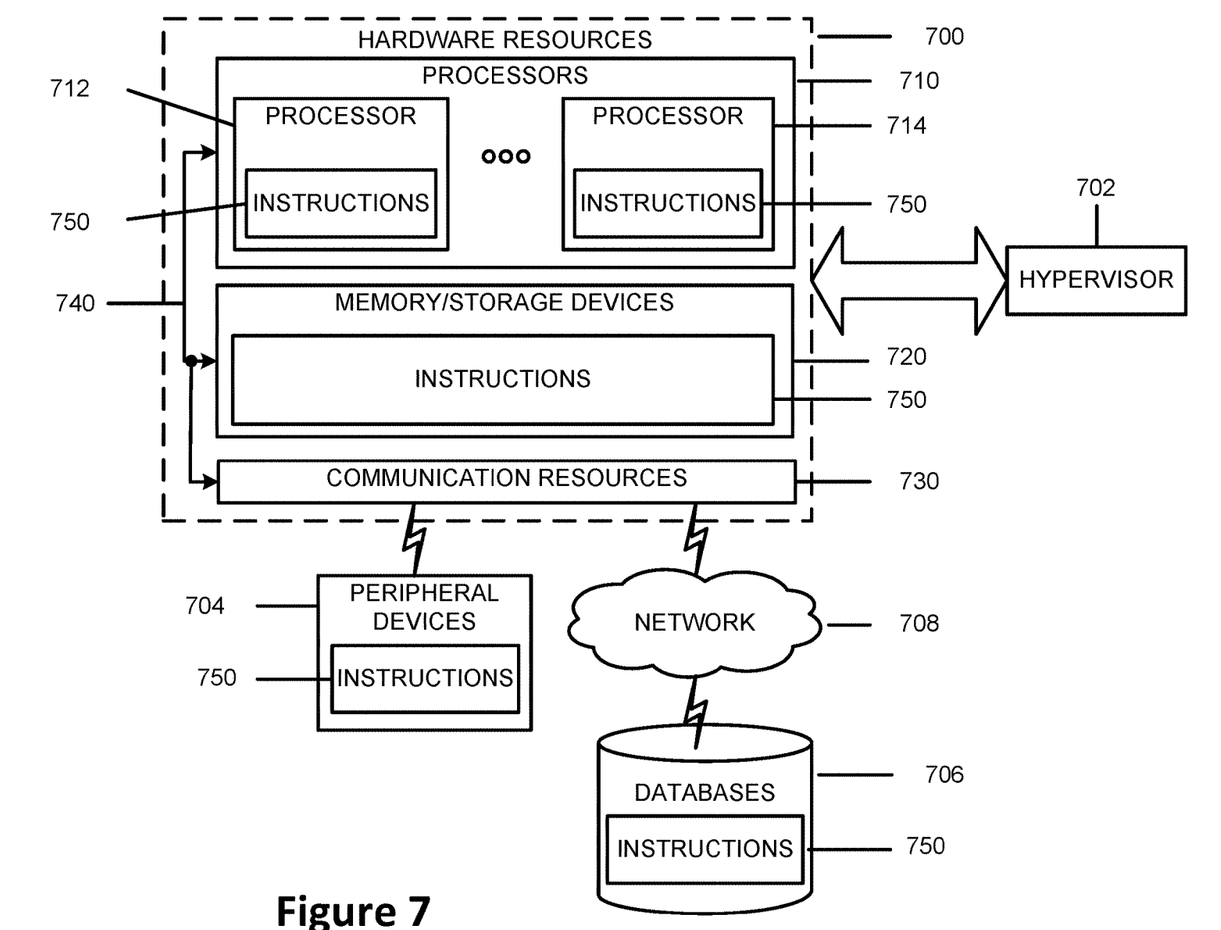
FIG. 7 illustrates hardware resources in accordance with some embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. For example, in an embodiment in which the hardware resources 700 are implemented into the UE 100, the instructions 750 may cause the UE to perform some or all of the operation flow/algorithmic structure 500. In other embodiments, the hardware resources 700 may be implemented into the TE 440. The instructions 750 may cause the TE 440 to perform some or all of the operation flow/algorithmic structure 505. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting Examples of various embodiments are provided below.

Example 1 may include one or more computer-readable media (CRM) comprising instructions to, upon execution of the instructions by one or more processors of a UE, cause the UE to: determine a first synchronization signal-reference signal received power (SS-RSRP) based on a first reception of a first signal of a frequency range 2 (FR2) synchronization signal, the FR2 synchronization signal (SS) targeted with a power level; determine a second SS-RSRP based on a second reception of a second signal that includes the FR2 SS and artificial noise, the second signal targeted with a signal-to-noise ratio (SNR); and determine an SS-RSRP delta based on a difference between the first SS-RSRP and the second SS-RSRP.

Example 2 may include the one or more CRM of examples 1-2 and/or some other example herein, wherein the instructions, when executed, further cause the UE to report the SS-RSRP delta to a test equipment (TE).

Example 3 may include the one or more CRM of examples 1-2 and/or some other example herein, wherein the first signal of the FR2 SS is targeted with the power level S at a receiver reference point of the UE and the second signal is targeted with the SNR value at the receiver reference point of the UE.

Example 4 may include the one or more CRM of example 3 and/or some other example herein, wherein the receiver reference point is a reference point for the receiver and is after a receiver beamforming.

Example 5 may include the one or more CRM of example 4 and/or some other example herein, wherein the artificial noise is targeted to deliver artificial noise of power level N at the receiver reference point at the UE, to provide the second signal with the SNR value at the receiver reference point of the UE.

Example 6 may include the one or more CRM of examples 1-2 and/or some other example herein, wherein the first signal of the FR2 SS is targeted with the power level S at transmission of a test equipment (TE) and the second signal is targeted with the SNR value at the transmission of the TE.

Example 7 may include the one or more CRM of example 6 and/or some other example herein, wherein the artificial noise is targeted to deliver artificial noise of power level N at the receiver reference point at the UE, to provide the second signal with the SNR value at the transmission of the TE.

Example 8 may include the one or more CRM of examples 1-2 and/or some other example herein, wherein to determine the SS-RSRP delta, the UE is to calculate the difference the first SS-RSRP and the second SS-RSRP.

Example 9 may include the one or more CRM of examples 1-2 and/or some other example herein, wherein the instructions, when executed, further cause the UE to receive the first signal via an antenna array with a receiver beamforming configuration; and receive the second signal via the antenna array with the receiver beamforming configuration.

Example 10 may include the one or more CRM of example 9 and/or some other example herein, wherein the antenna array includes a plurality of antenna elements and one or more associated feeding networks.

Example 11 may include the one or more CRM of examples 9 and 10 and/or some other example herein, wherein to determine the first SS-RSRP, the UE is to measure the first SS-RSRP based on the received first signal, and wherein to determine the second SS-RSRP, the UE is to measure the second SS-RSRP based on the received second signal.

Example 10 may include the one or more CRM of example 1 and/or some other example herein, wherein, upon execution, the instructions further cause the UE to determine an absolute SS-RSRP accuracy value based on the determined SS-RSRP delta.

Example 11 may include the one or more CRM of example 1 and/or some other example herein, wherein, upon execution, the instructions further cause the UE to determine a relative SS-RSRP accuracy value based on the determined SS-RSRP delta.

Example 12 may include the one or more CRM of example 1 and/or some other example herein, wherein the SNR value is predetermined, and a ratio between the power level S and the power level N is targeted to be equal to the predetermined SNR value.

Example 13 may include the one or more CRM of example 12 and/or some other example herein, wherein the SNR value is −6 dB.

Example 14 may include the one or more CRM of example 12 and/or some other example herein, wherein the power level S is substantially greater than thermal noise.

Example 15 may include the one or more CRM of example 14 and/or some other example herein, wherein the power level S is at least 10 dB greater than the thermal noise.

Example 16 may include the one or more CRM of example 12 and/or some other example herein, wherein the power level N is substantially greater than thermal noise.

Example 17 may include the one or more CRM of example 16 and/or some other example herein, wherein the power level N is at least 10 dB greater than the thermal noise.

Example 18 may include the one or more CRM of example 1 and/or some other example herein, wherein the first signal and the second signal are transmitted by a transmitter associated with an over-the-air (OTA) test equipment.

Example 19 may include the one or more CRM of example 1 and/or some other example herein, wherein, upon execution, the instructions further cause the UE to determine whether an SS-RSRP accuracy requirement is satisfied based on the determined SS-RSRP delta.

Example 1Q may include one or more computer-readable media (CRM) comprising instructions to, upon execution of the instructions by one or more processors of a UE, cause the UE to: determine a first synchronization signal-reference signal received power (SS-RSRQ) based on a first reception of a first signal of a frequency range 2 (FR2) synchronization signal, the FR2 synchronization signal (SS) targeted with a power level; determine a second SS-RSRQ based on a second reception of a second signal that includes the FR2 SS and artificial noise, the second signal targeted with a signal-to-noise ratio (SNR); and determine an SS-RSRQ delta based on a difference between the first SS-RSRQ and the second SS-RSRQ.

Example 2Q may include the one or more CRM of examples 1Q-2Q and/or some other example herein, wherein the instructions, when executed, further cause the UE to report the SS-RSRQ delta to a test equipment (TE).

Example 3Q may include the one or more CRM of examples 1Q-2Q and/or some other example herein, wherein the first signal of the FR2 SS is targeted with the power level S at a receiver reference point of the UE and the second signal is targeted with the SNR value at the receiver reference point of the UE.

Example 4Q may include the one or more CRM of example 3Q and/or some other example herein, wherein the receiver reference point is a reference point for the receiver and is after a receiver beamforming.

Example 5Q may include the one or more CRM of example 4Q and/or some other example herein, wherein the artificial noise is targeted to deliver artificial noise of power level N at the receiver reference point at the UE, to provide the second signal with the SNR value at the receiver reference point of the UE.

Example 6Q may include the one or more CRM of examples 1Q-2Q and/or some other example herein, wherein the first signal of the FR2 SS is targeted with the power level S at transmission of a test equipment (TE) and the second signal is targeted with the SNR value at the transmission of the TE.

Example 7Q may include the one or more CRM of example 6Q and/or some other example herein, wherein the artificial noise is targeted to deliver artificial noise of power level N at the receiver reference point at the UE, to provide the second signal with the SNR value at the transmission of the TE.

Example 8Q may include the one or more CRM of examples 1Q-2Q and/or some other example herein, wherein to determine the SS-RSRQ delta, the UE is to calculate the difference the first SS-RSRQ and the second SS-RSRQ.

Example 9Q may include the one or more CRM of examples 1Q-2Q and/or some other example herein, wherein the instructions, when executed, further cause the UE to receive the first signal via an antenna array with a receiver beamforming configuration; and receive the second signal via the antenna array with the receiver beamforming configuration.

Example 10Q may include the one or more CRM of example 9Q and/or some other example herein, wherein the antenna array includes a plurality of antenna elements and one or more associated feeding networks.

Example 11Q may include the one or more CRM of examples 9Q and 10Q and/or some other example herein, wherein to determine the first SS-RSRQ, the UE is to measure the first SS-RSRQ based on the received first signal, and wherein to determine the second SS-RSRQ, the UE is to measure the second SS-RSRQ based on the received second signal.

Example 10Q may include the one or more CRM of example 1Q and/or some other example herein, wherein, upon execution, the instructions further cause the UE to determine an absolute SS-RSRQ accuracy value based on the determined SS-RSRQ delta.

Example 11Q may include the one or more CRM of example 1Q and/or some other example herein, wherein, upon execution, the instructions further cause the UE to determine a relative SS-RSRQ accuracy value based on the determined SS-RSRQ delta.

Example 12Q may include the one or more CRM of example 1Q and/or some other example herein, wherein the SNR value is predetermined, and a ratio between the power level S and the power level N is targeted to be equal to the predetermined SNR value.

Example 13Q may include the one or more CRM of example 12Q and/or some other example herein, wherein the SNR value is −6 dB.

Example 14Q may include the one or more CRM of example 12Q and/or some other example herein, wherein the power level S is substantially greater than thermal noise.

Example 15Q may include the one or more CRM of example 14Q and/or some other example herein, wherein the power level S is at least 10 dB greater than the thermal noise.

Example 16Q may include the one or more CRM of example 12Q and/or some other example herein, wherein the power level N is substantially greater than thermal noise.

Example 17Q may include the one or more CRM of example 16Q and/or some other example herein, wherein the power level N is at least 10 dB greater than the thermal noise.

Example 18Q may include the one or more CRM of example 1Q and/or some other example herein, wherein the first signal and the second signal are transmitted by a transmitter associated with an over-the-air (OTA) test equipment.

Example 19Q may include the one or more CRM of example 1Q and/or some other example herein, wherein, upon execution, the instructions further cause the UE to determine whether an SS-RSRQ accuracy requirement is satisfied based on the determined SS-RSRQ delta.

Example 20 may include one or more computer-readable media (CRM) comprising instructions to, upon execution of the instructions by one or more processors of a TE, cause the TE to generate a first signal that includes an FR2 SS of a target power level S; transmit the first signal via one or more transmitters to a UE; generate a second signal that includes the FR2 SS of the target power level S and artificial noise of power level N, based on a target signal-to-noise (SNR) value; and transmit the second signal via the one or more transmitters to the UE.

Example 21 may include the one or more CRM of example 20 and/or some other example herein, wherein the transmission of the first signal and the transmission of the second signal are for measuring an SS-RSRP delta or SS-RSRQ delta.

Example 22 may include the one or more CRM of examples 20-21 and/or some other example herein, wherein, upon execution, the instructions further cause the TE to receive a reported value based on an SS-RSRP accuracy measurement or an SS-RSRQ accuracy measurement by the UE.

Example 23 may include the one or more CRM of example 22 and/or some other example herein, wherein, upon execution, the instructions further cause the TE to determine whether the UE satisfies an SS-RSRP accuracy requirement or an SS-RSRQ requirement based on the reported value.

Example 24 may include an apparatus comprising means to perform one or more elements of a method or CRM described in or related to any of examples 1-23 and 1Q-19Q, or any other method or process described herein.

Example 25 may include one or more non-transitory computer-readable media comprising instructions to cause an electronic device, upon execution of the instructions by one or more processors of the electronic device, to perform one or more elements of a method or CRM described in or related to any of examples 1-23 and 1Q-19Q, or any other method or process described herein.

Example 26 may include an apparatus comprising logic, modules, and/or circuitry to perform one or more elements of a method or CRM described in or related to any of examples 1-23 and 1Q-19Q, or any other method or process described herein.

Example 27 may include a method, technique, or process as described in or related to any of examples 1-23 and 1Q-19Q, or portions or parts thereof.

Example 28 may include an apparatus comprising: one or more processors and one or more computer-readable media comprising instructions that, when executed by the one or more processors, cause the one or more processors to perform the method, techniques, or process as described in or related to any of examples 1-23 and 1Q-19Q, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. A non-transitory computer-readable medium (CRM) comprising instructions to, upon execution of the instructions by one or more processors of a user equipment (UE), cause the UE to perform operations, the operations comprising:
   determining a first synchronization signal-reference signal received power (SS-RSRP) based on a first reception of a first signal of a frequency range 2 (FR2) synchronization signal, wherein the FR2 synchronization signal corresponds to a power level S at a receiver reference point of the UE;
   determining a second SS-RSRP based on a second reception of a second signal that includes the FR2 synchronization signal and artificial noise, wherein the second signal corresponds to a signal-to-noise ratio (SNR) value at the receiver reference point of the UE;
   determining an SS-RSRP delta based on a difference between the first SS-RSRP and the second SS-RSRP; and
   generating a report based on the SS-RSRP delta.

2. The non-transitory CRM of claim 1, wherein the artificial noise corresponds to a power level N at the receiver reference point of the UE, wherein the SNR value at the receiver reference point of the UE corresponds to the power level of the artificial noise, and wherein the receiver reference point of the UE is a reference point after receiver beamforming.

3. The non-transitory CRM of claim 2, wherein the SNR value is predetermined, and wherein a ratio between the power level S and the power level N is equal to the predetermined SNR value.

4. The non-transitory CRM of claim 3, wherein the SNR value is −6 dB.

5. The non-transitory CRM of claim 1, wherein the operations further comprise:
   receiving the first signal via an antenna array with a receiver beamforming configuration; and
   receiving the second signal via the antenna array with the receiver beamforming configuration.

6. The non-transitory CRM of claim 5, wherein the antenna array includes a plurality of antenna elements, and wherein one or more antenna elements of the plurality of antenna elements are associated with feeding networks.

7. The non-transitory CRM of claim 5, wherein the determining the first SS-RSRP comprises measuring the first SS-RSRP based on the first signal, and wherein the determining the second SS-RSRP comprises measuring the second SS-RSRP based on the second signal.

8. The non-transitory CRM of claim 1, wherein the operations further comprise: determining an absolute SS-RSRP accuracy value based on the SS-RSRP delta.

9. The non-transitory CRM of claim 1, wherein the operations further comprise: determining the difference between the first SS-RSRP and the second SS-RSRP.

10. The non-transitory CRM of claim 1, wherein the operations further comprise: receiving the first signal and the second signal from a transmitter associated with an over-the-air (OTA) test equipment.

11. The non-transitory CRM of claim 1, wherein the power level S is predetermined to be greater than a receiving sensitivity limit of the UE.

12. A non-transitory computer-readable medium (CRM) comprising instructions to, upon execution of the instructions by one or more processors of a user equipment (UE), cause the UE to perform operations, the operations comprising:
   determining a first synchronization signal-reference signal received quality (SS-RSRQ) based on a first reception of a first signal, wherein the first signal includes a synchronization signal corresponding to a power level S in a frequency range 2 (FR2);
   determining a second SS-RSRQ based on a second reception of a second signal, wherein the second signal includes the synchronization signal and artificial noise, wherein the second signal corresponds to a target signal-to-noise (SNR) value, and wherein the artificial noise corresponds to a power level N; and
   determining an SS-RSRQ delta based on a difference between the first SS-RSRQ and the second SS-RSRQ.

13. The non-transitory CRM of claim 12, wherein the operations further comprise:
   receiving the first signal via an antenna array with a receiver beamforming configuration; and
   receiving the second signal via the antenna array with the receiver beamforming configuration.

14. The non-transitory CRM of claim 12, wherein the operations further comprise: determining an absolute SS-RSRQ accuracy value based on the SS-RSRQ delta.

15. The non-transitory CRM of claim 12, wherein the second signal is configured with the target SNR value.

16. The non-transitory CRM of claim 12, wherein the power level S is predetermined to be greater than a receiving sensitivity limit of the UE.

17. A user equipment (UE), comprising:
   one or more baseband processors, configured to:
      measure a first synchronization signal-reference signal received power (SS-RSRP) based on a first reception of a first signal; and
      measure a second SS-RSRP based on a second reception of a second signal; and
   a central processing unit (CPU) coupled with the one or more baseband processors, configured to determine an SS-RSRP delta based on a difference between the first SS-RSRP and the second SS-RSRP,
   wherein the first signal is a synchronization signal corresponding to a target power level S, wherein the second signal includes the synchronization signal and artificial noise of power level N, and wherein the second signal corresponds to a target signal-to-noise (SNR) value.

18. The UE of claim 17, wherein the one or more baseband processors are further configured to: receive the first signal and the second signal via a configured receiver beamforming in a frequency range 2 (FR2).

19. The UE of claim 17, wherein the CPU is further configured to: determine an absolute SS-RSRP accuracy value based on the SS-RSRP delta.

20. The UE of claim 17, wherein the target power level S and the target SNR value are based on a receiver reference point of the UE after a receiver beamforming in a frequency range 2 (FR2).

* * * * *